United States Patent
Matsuo et al.

(10) Patent No.: US 10,085,285 B2
(45) Date of Patent: *Sep. 25, 2018

(54) WIRELESS COMMUNICATION APPARATUS AND INTERFERENCE DETECTION METHOD

(71) Applicant: KABUSHIKI KAISHA TOSHIBA, Minato-ku, Tokyo (JP)

(72) Inventors: Ryoko Matsuo, Tokyo (JP); Tomoya Tandai, Tokyo (JP); Takeshi Tomizawa, Yokohama (JP); Tomoko Adachi, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,521

(22) Filed: Dec. 1, 2016

(65) Prior Publication Data

US 2017/0086227 A1 Mar. 23, 2017

Related U.S. Application Data

(63) Continuation of application No. 14/716,428, filed on May 19, 2015, now Pat. No. 9,553,688, which is a (Continued)

(30) Foreign Application Priority Data

Feb. 29, 2012 (JP) .................................. 2012-044369

(51) Int. Cl.
*H04W 74/08* (2009.01)
*H04W 24/02* (2009.01)
(Continued)

(52) U.S. Cl.
CPC .......... *H04W 74/0816* (2013.01); *G08B 5/36* (2013.01); *H04B 17/318* (2015.01);
(Continued)

(58) Field of Classification Search
CPC ......... H04W 74/0808; H04W 74/0816; H04W 24/02; H04W 24/08; H04W 84/12;
(Continued)

(56) References Cited

U.S. PATENT DOCUMENTS

| 6,067,291 A | 5/2000 | Kamerman et al. |
| 7,366,144 B2 | 4/2008 | Kamerman et al. |

(Continued)

FOREIGN PATENT DOCUMENTS

| JP | 11-163897 A | 6/1999 |
| JP | 2001-237849 A | 8/2001 |

(Continued)

OTHER PUBLICATIONS

Japanese Office Action dated Nov. 25, 2014, issued in counterpart Japanese Application No. 2012-044369 and translation.

(Continued)

*Primary Examiner* — Jianye Wu
(74) *Attorney, Agent, or Firm* — Foley & Lardner LLP

(57) ABSTRACT

According to one embodiment, a wireless communication apparatus is provided with first and second determination units. The first unit determines based on a first carrier sense threshold whether busy state or not and specifies a first time when busy state is determined with the first threshold, and determines based on a second carrier sense threshold smaller than the first threshold whether busy state or not and specifies a second time when busy state is determined. The second unit determines, if at least busy state is determined based on the second threshold and the second time precedes
(Continued)

a reference time equal to or earlier than the first time, to perform processing for avoiding interference.

20 Claims, 12 Drawing Sheets

Related U.S. Application Data continuation of application No. 13/727,406, filed on Dec. 26, 2012, now Pat. No. 9,066,245.

(51) Int. Cl.
| | | |
|---|---|---|
| *H04J 11/00* | (2006.01) | |
| *H04W 24/08* | (2009.01) | |
| *H04B 17/345* | (2015.01) | |
| *H04B 17/318* | (2015.01) | |
| *H04W 84/12* | (2009.01) | |
| *G08B 5/36* | (2006.01) | |

(52) U.S. Cl.
CPC ........ *H04B 17/345* (2015.01); *H04J 11/0023* (2013.01); *H04W 24/02* (2013.01); *H04W 24/08* (2013.01); *H04W 74/0808* (2013.01); *H04W 84/12* (2013.01)

(58) Field of Classification Search
CPC . H04J 11/0023; H04B 17/318; H04B 17/345; G08B 5/36
See application file for complete search history.

(56) References Cited

U.S. PATENT DOCUMENTS

| | | | |
|---|---|---|---|
| 7,903,607 B2 | 3/2011 | Utsunomiya et al. | |
| 8,705,561 B2 | 4/2014 | Ito et al. | |
| 9,553,688 B2 * | 1/2017 | Matsuo | H04W 74/0808 |
| 2005/0265298 A1 | 12/2005 | Adachi et al. | |
| 2007/0133473 A1 * | 6/2007 | Takagi | H04W 74/08 370/334 |
| 2010/0020711 A1 * | 1/2010 | Horisaki | H04L 12/413 370/252 |
| 2010/0085161 A1 | 4/2010 | Nishikawa | |
| 2011/0044257 A1 * | 2/2011 | Utsunomiya | H04W 72/082 370/329 |
| 2013/0223250 A1 | 8/2013 | Matsuo et al. | |

FOREIGN PATENT DOCUMENTS

| | | | |
|---|---|---|---|
| JP | 2008-054303 A | 3/2008 | |
| JP | 2009-296627 A | 12/2009 | |
| JP | 2013-183221 A | 9/2013 | |

OTHER PUBLICATIONS

Applicant-provided Background Art Information Sheet.
Japanese Office Action dated Mar. 29, 2016 issued in corresponding Japanese Application No. 2015-110709 and its English machine translation thereof from the Japanese Patent Office.
Japanese Office Action dated Jul. 5, 2016 issued in corresponding Japanese Application No. 2015-110709 and its English machine translation thereof.
Matsuo: Office Action dated Nov. 18, 2015 as received in U.S. Appl. No. 14/716,428.
Matsuo: Office Action dated Mar. 11, 2016 as received in U.S. Appl. No. 14/716,428.
Matsuo: Notice of Allowance dated Sep. 6, 2016 as received in U.S. Appl. No. 14/716,428.
Japanese Office Action dated Jul. 25, 2017 issued in corresponding application No. 2016-172713 and its English machine translation thereof.

* cited by examiner

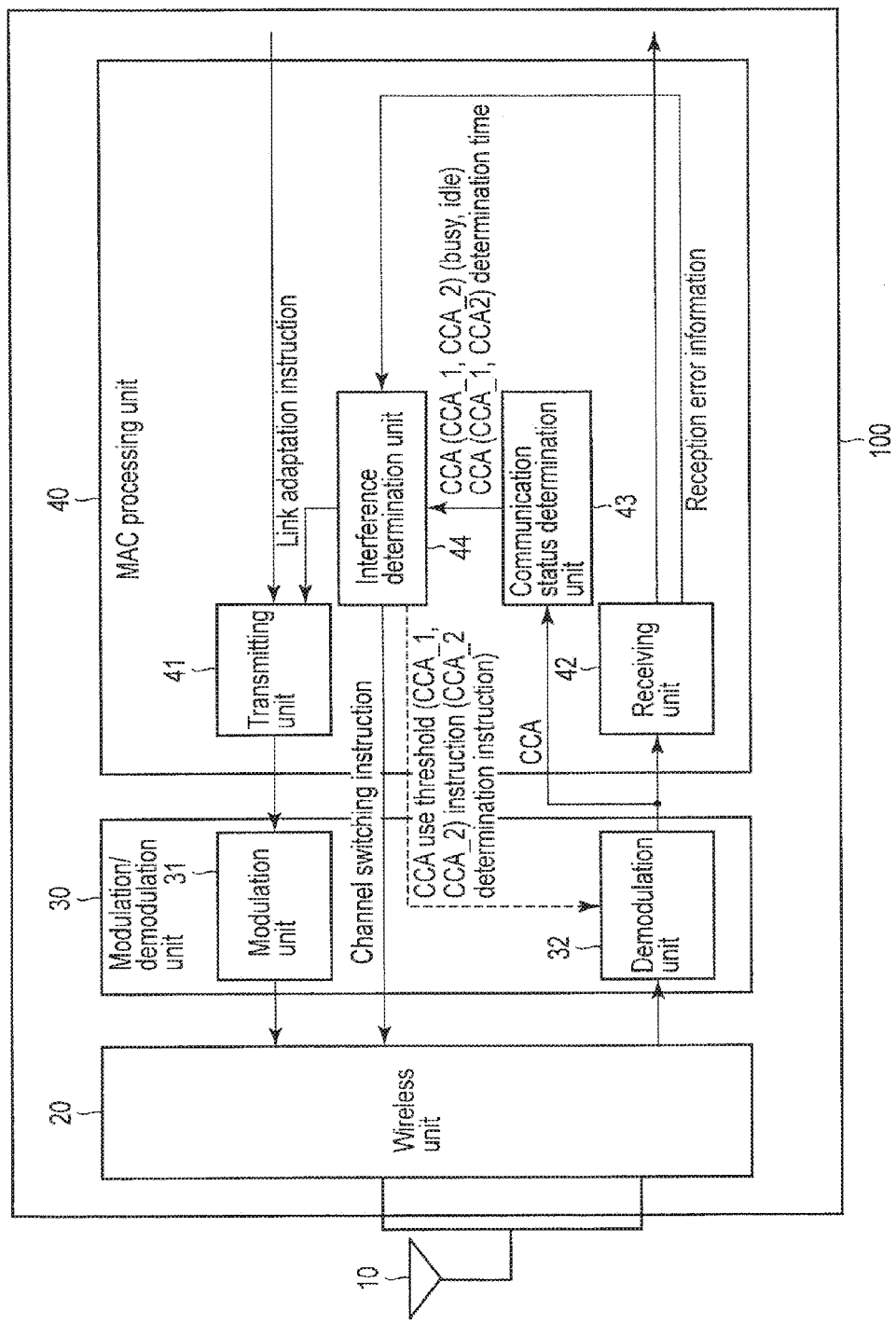
F I G. 3

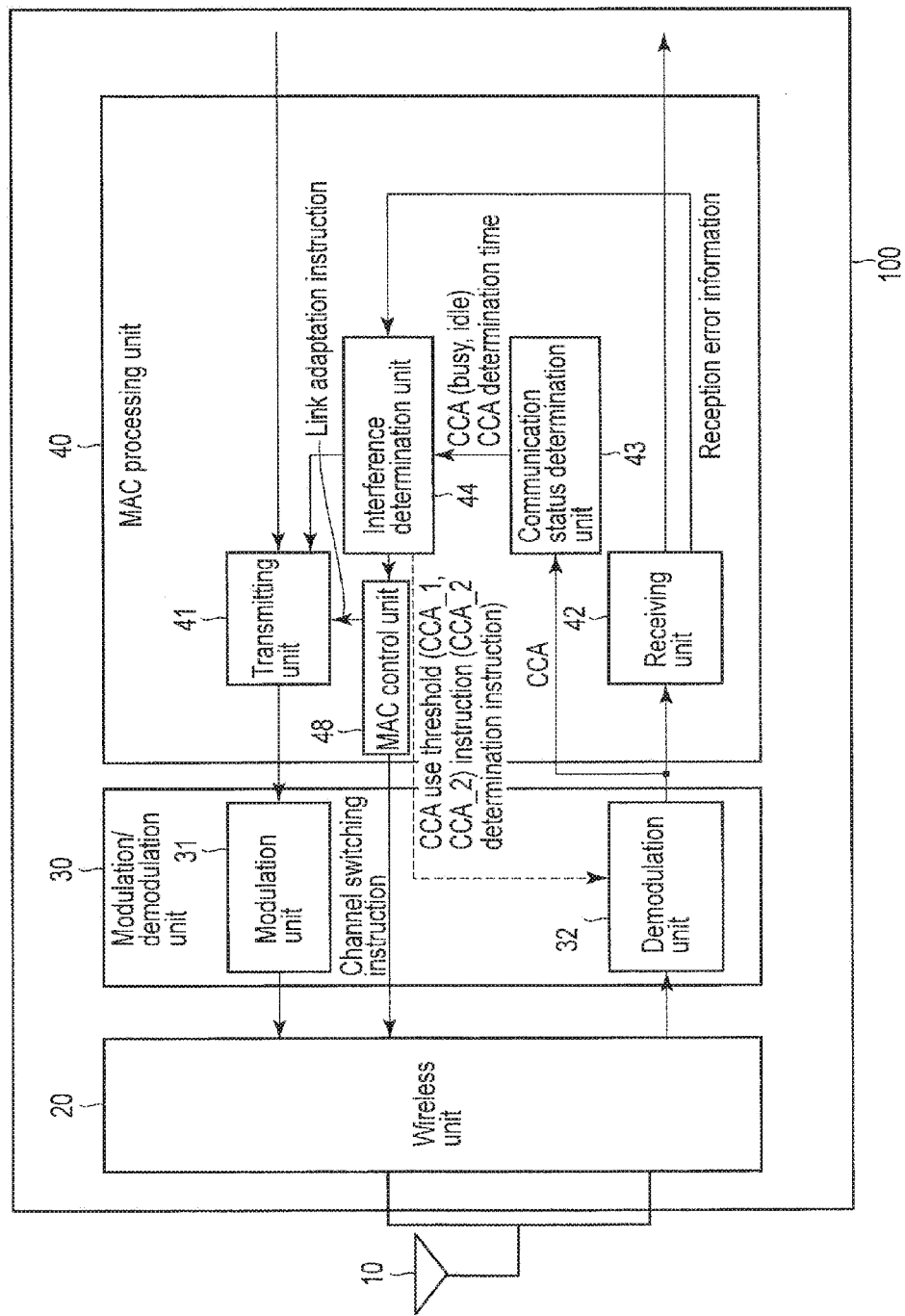
F I G. 4

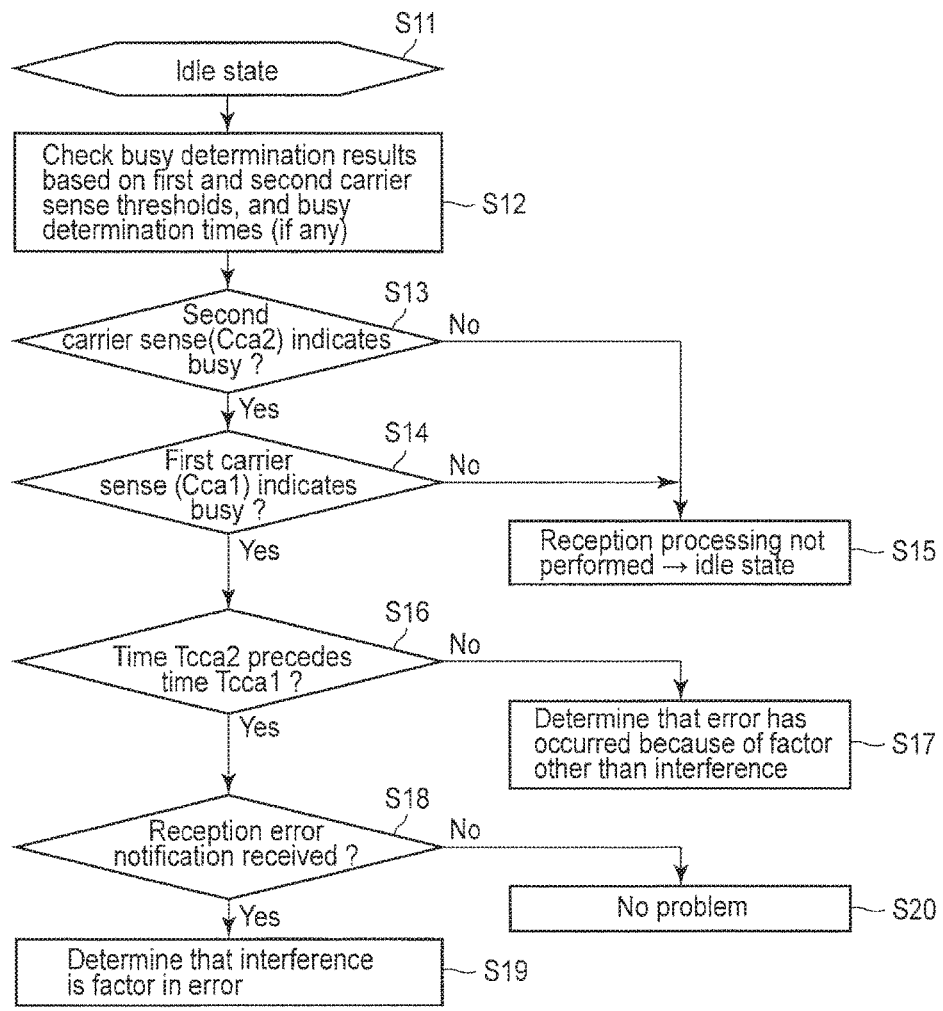
F I G. 5

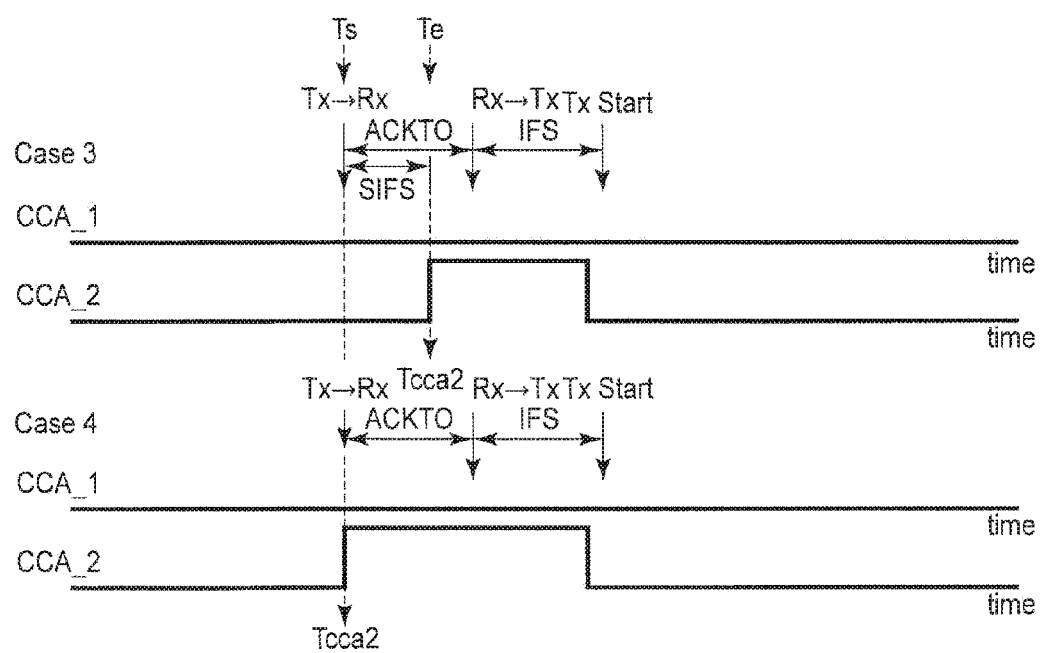
F I G. 8

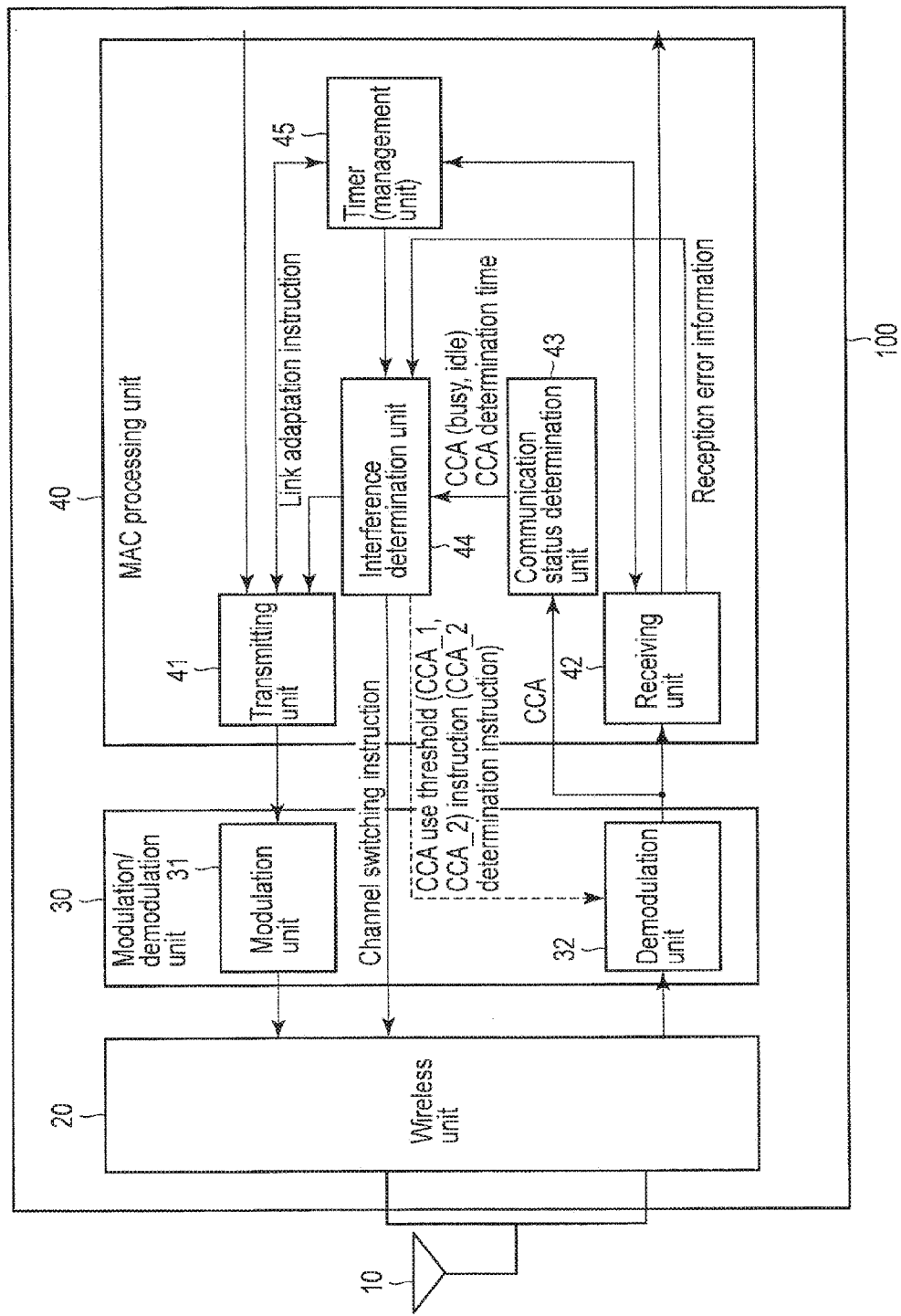
F I G. 9

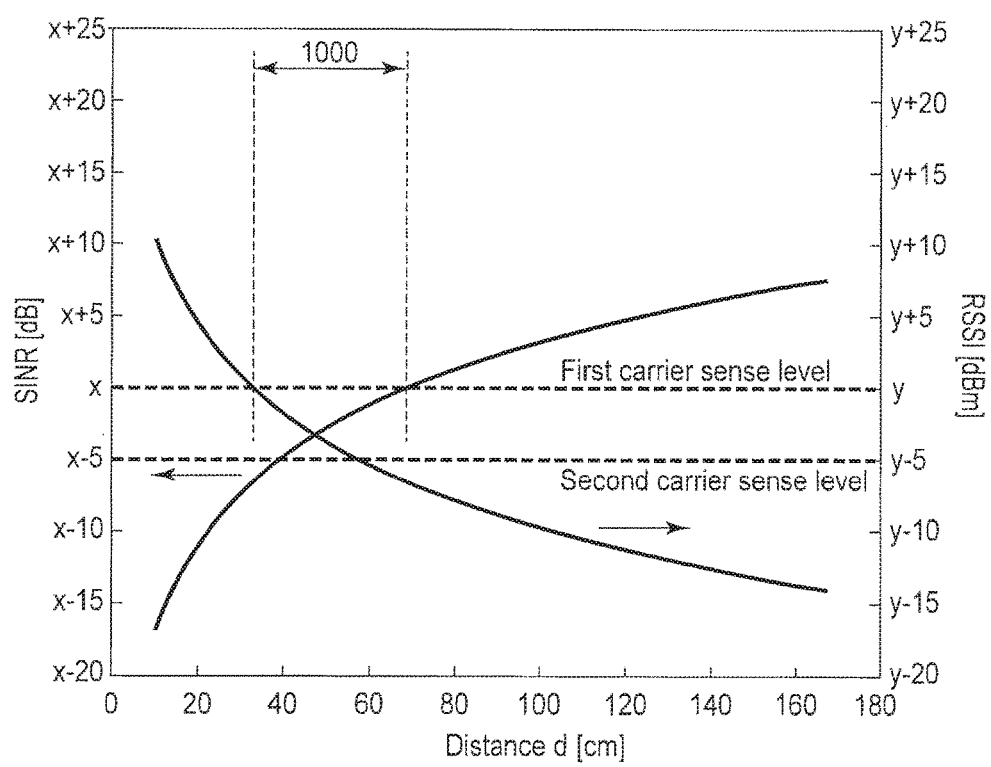
F I G. 12

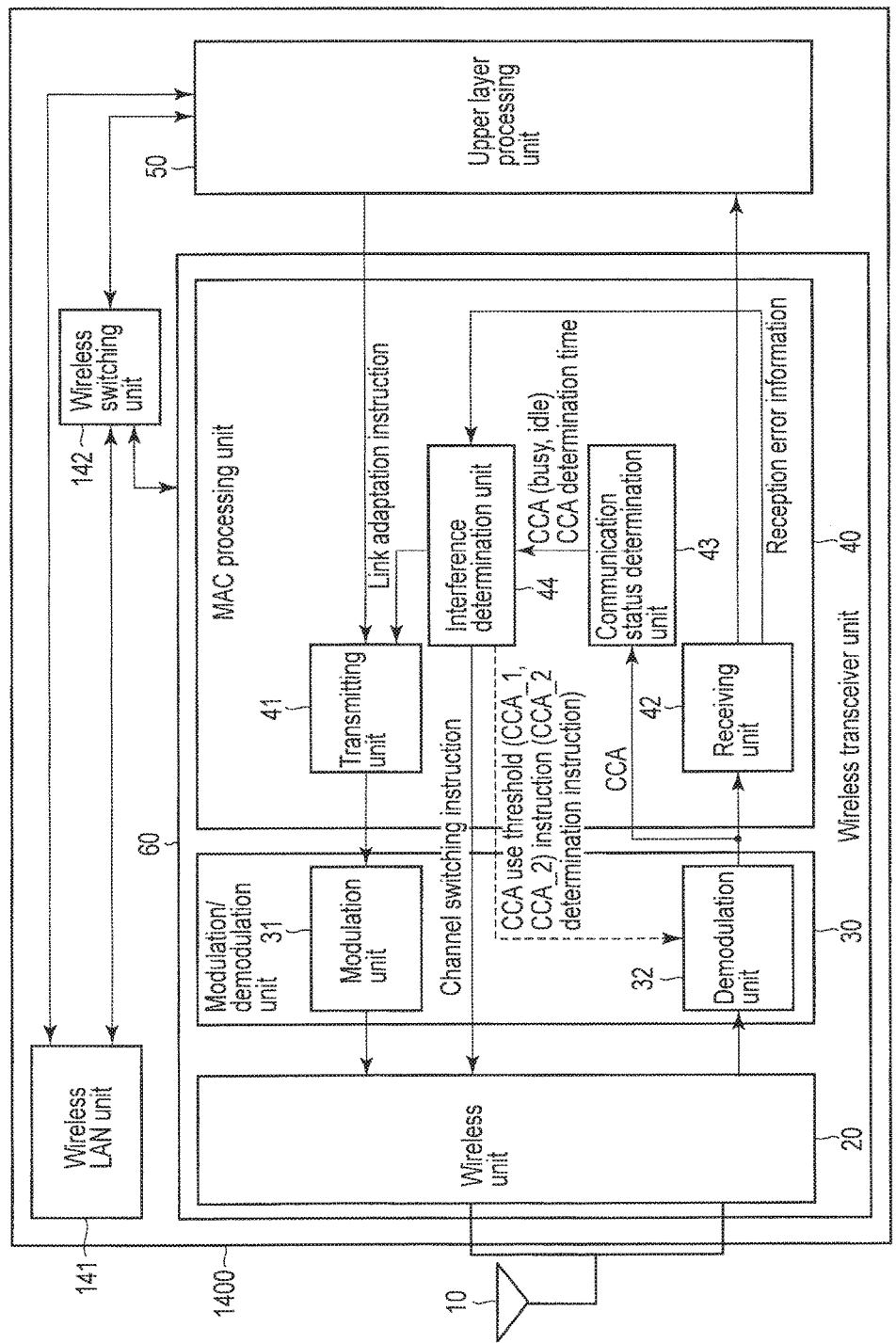
F I G. 14

WIRELESS COMMUNICATION APPARATUS AND INTERFERENCE DETECTION METHOD

CROSS-REFERENCE TO RELATED APPLICATIONS

This application is a Continuation application of application Ser. No. 14/716,428, filed May 19, 2015, which is a Continuation application of application Ser. No. 13/727,406, filed Dec. 26, 2012, which is based upon and claims the benefit of priority from Japanese Patent Application No. 2012-044369, filed Feb. 29, 2012, the entire contents of which are incorporated herein by reference.

FIELD

Embodiments described herein relate generally to a wireless communication apparatus and an interference detection method.

BACKGROUND

Today, as a wireless system technique for high-speed transmission using a millimeter waveband, the WirelessHD standard has been established, and such wireless system technique is being standardized for traditional wireless local area networks (in particular, 802.11a/b/g networks).

A wireless system using a millimeter waveband experiences a problem in an attempt to coexist with other wireless systems in the same frequency band and to detect interference.

In a traditional wireless LAN, access control is performed in the CSMA/CA scheme. According to the access control, each wireless communication apparatus measures and detects the occupancy status of a wireless channel before using it, and randomly sets backoff before transmission, thereby enabling a plurality of wireless communication apparatuses to fairly share a band.

On the other hand, in near-field wireless communication, it is desirable to provide a method which emphasizes facilitation of connection and an improvement in efficiency. Assume, however, that the sensitivity point of a carrier sense is set high so that only wireless communication apparatuses close to each other perform connection processing in near-field communication. In this case, if an error has occurred in transmission/reception processing, it is difficult to determine whether the error has occurred because of interference or another factor (for example, the situation between the wireless communication apparatuses in near-field communication).

When an error occurs in transmission/reception processing in near-field wireless communication, it is difficult to determine whether interference is the factor in the error. When an error occurs, therefore, it is difficult to determine whether to perform processing for avoiding interference.

BRIEF DESCRIPTION OF THE DRAWINGS

FIG. 3 is an exemplary block diagram showing a wireless communication apparatus according to the first embodiment;

FIG. 4 is another exemplary block diagram showing the wireless communication apparatus according to the first embodiment;

FIG. 5 is an exemplary flowchart illustrating interference determination processing according to the first embodiment;

FIG. 8 is a timing chart for explaining another example of the carrier sense according the second embodiment;

FIG. 9 is an exemplary block diagram showing a wireless communication apparatus according to the second embodiment;

FIG. 12 is a graph for explaining carrier sense thresholds according to the first to 17th embodiments;

FIG. 14 is an exemplary block diagram showing a wireless communication apparatus according to the 16th embodiment.

DETAILED DESCRIPTION

Figure 1:
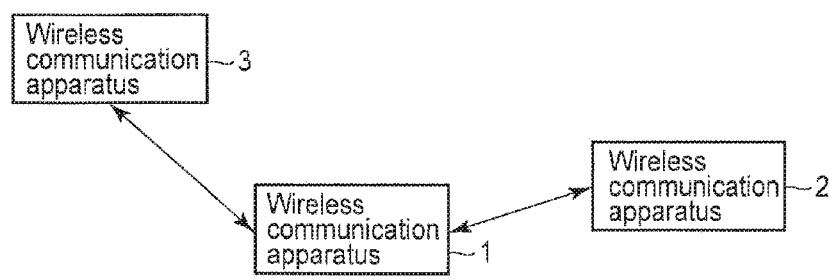
FIG. 1 is an exemplary view showing a wireless communication system according to the first to 17th embodiments.

A wireless communication apparatus according to embodiments of the present invention will be described in detail below with reference to the accompanying drawings. Note that components with the same reference number perform the same operation in the following embodiments, and a repetitive description thereof will be omitted.

In general, according to one embodiment, a wireless communication apparatus is provided with a first determination unit and a second determination unit. The first determination unit determines based on a first carrier sense threshold whether a busy state is indicated, specifies a first time when the busy state is determined based on the first carrier sense threshold, determines based on a second carrier sense threshold smaller than the first carrier sense threshold whether a busy state is indicated, and specifies a second time when the busy state is determined based on the second carrier sense threshold. The second determination unit determines, if at least the busy state is determined based on the second carrier sense threshold and the second time precedes a reference time equal to or earlier than the first time, to perform processing for avoiding interference.

According to the embodiment, when an error occurs in transmission/reception processing in near-field wireless communication, it is possible to determine whether to perform processing for avoiding interference.

As described above, in a traditional wireless LAN, access control is performed in the CSMA/CA scheme to emphasize interference avoidance and the fairness of sharing a wireless band.

In contrast, assuming a wireless system which uses near-field wireless communication (for example, a communication range of up to several tens of centimeters), only wireless communication apparatuses within the communication range have a mutual influence on each other in such near-field wireless communication. It is, therefore, desirable to provide a method which emphasizes facilitation of connection and an improvement in efficiency rather than a method which emphasizes interference avoidance and the fairness of sharing a wireless band (for example, a method in which one given wireless communication apparatus as an access point transmits a broadcast signal (for example, a beacon signal), and each wireless communication apparatus performs random backoff control every time it transmits a signal).

For example, assuming near-field communication as described above, the sensitivity point of a carrier sense may be set high so that only wireless communication apparatuses close to each other perform connection processing. In this case, a given wireless communication apparatus transmits a connection request signal to a partner wireless communication apparatus, and the partner wireless communication apparatus performs detection and reception processing based on a high sensitivity point carrier sense threshold, and transmits a connection response signal, thereby starting communication between the two wireless communication apparatuses.

If, however, a high sensitivity point carrier sense which assumes near-field communication is used, a scene that "the clear channel assessment (CCA), herein after we call CCA as carrier sense threshold, determines an idle state but a required signal-to-interference-plus-noise ratio (SINR) is not actually satisfied because of the influence of another wireless communication system or the like" may be occur. In this case, since a determination result based on the carrier sense threshold is an idle state, it is difficult to determine, when an error occurs in transmission/reception processing, whether a factor in the error in transmission/reception processing is interference or another factor (for example, the situation between the wireless communication apparatuses in near-field communication).

As a method of determining whether an error has occurred because of interference or not, the following mechanism is possible. That is, if "a reception error has occurred" and "received power is greater than or equal to an interference determination threshold", it is determined that the factor is interference. If it is determined that the factor is interference, the number of retransmission operations and a transmission rate are controlled. Even if, however, a carrier sense threshold is used as the interference determination threshold, it is impossible to determine whether a factor in the transmission/reception error is interference.

According to each of the following embodiments, when an error occurs in transmission/reception processing in near-field wireless communication, it is possible to determine whether to perform processing for avoiding interference.

Note that "processing for avoiding interference" may be any processing as long as it makes it possible to continue wireless communication even when interference occurs. For example, there are the following various processes:

Changing channel to be used
Changing transmission rate
Notifying user
Changing interframe space
Any combination thereof
Note that the processing is not limited to them.

First Embodiment

FIG. 1 shows an example of a wireless communication system according to the first to 17th embodiments. In the example of FIG. 1, three wireless communication apparatuses 1 to 3 are included in the wireless communication system. Note that the number of wireless communication apparatuses included in the wireless communication system is not limited to three.

As a practical example of the wireless communication system of the embodiment, a wireless communication system which uses near-field wireless communication with a communication range of only about several tens of centimeters is assumed. Assume in the wireless communication system that only several wireless communication apparatuses are connected with one wireless communication apparatus since only wireless communication apparatuses within the short communication range have a mutual influence on each other. Referring to FIG. 1, for example, the wireless communication apparatus 1 performs one-to-one inter-apparatus communication with the wireless communication apparatus 2, performs one-to-one interstation communication with the wireless communication apparatus 3, or performs multi-station communication with the wireless communication apparatuses 2 and 3.

In one-to-one near-field communication between the wireless communication apparatuses as shown in FIG. 1, it is desirable to provide a method which emphasizes facilitation of connection and an improvement in efficiency rather than a method which emphasizes interference avoidance and the fairness of sharing a wireless band in a traditional wireless LAN. As an example, there is considered a technique of transmitting/receiving control signals such as a connection request signal (Connect Request) and a connection response signal (Connect Accept) between wireless communication apparatuses to start connection, and repeatedly performing transmission of a transmission signal and reception of a response signal (ACK or Block ACK [BA]) to it at a short regular interval such as a short interframe space (SIFS) after the processing of establishing connection is completed, thereby transmitting frames. Such a system requires a restriction that a wireless communication responds to a connection request from only a wireless communication apparatus located within the communication range. The above restriction is attained by setting the sensitivity point of a carrier sense threshold for signal detection high.

On the other hand, assume that there is another wireless communication system using the same frequency band. In this case, if a carrier sense is performed by setting the sensitivity point of the carrier sense threshold high as described above, an area may probably occur in which "the carrier sense determines an idle state but a required SINR is not satisfied because of the influence of the interference from the other wireless communication system". In such an area, although a wireless communication apparatus transmits a frame after confirming that the carrier sense before the transmission indicates an idle state, there is no response to the transmitted frame. Furthermore, in a wireless communication apparatus which receives a frame, a reception error occurs in the received frame even though the carrier sense indicates an idle state. It is difficult to determine whether a factor in the error is interference or another factor (for example, the distance between transmitting and receiving wireless communication apparatuses).

In the first embodiment, it is possible to determine whether the reception error has occurred because of interference, by performing a two-level carrier sense upon receiving a frame.

Idle/busy determination using two kinds of carrier senses (a two-level carrier sense) according to the embodiment will be described first.

Note that the two-level carrier sense includes a first carrier sense using a first carrier sense threshold, and a second carrier sense using a second carrier sense threshold.

Figure 2:
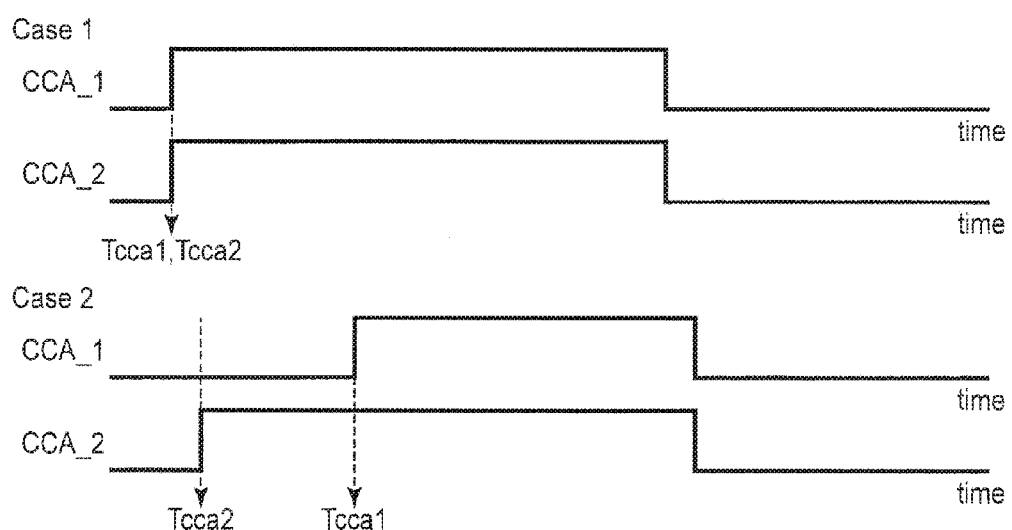
FIG. 2 is a timing chart for explaining an example of a carrier sense according to the first embodiment.

FIG. 2 shows the relationship between an idle/busy state and a determination time in the first carrier sense and second carrier sense used in the first embodiment.

Referring to FIG. 2, CCA_1 represents the first carrier sense, and CCA_2 represents the second carrier sense. The abscissa represents time. With respect to the ordinate, low level represents idle determination and high level represents busy determination.

There are various determination methods such as a method of making determination at all times, that of making determination at a regular interval, that of making determination for a given period of time when an instruction is provided, and that of making determination for an instructed period of time. In this embodiment, any method can be adopted.

The first carrier sense threshold is used in the actual carrier sense for determining an idle/busy state. In this case, the idle/busy determination itself can be performed by the first carrier sense. The second carrier sense threshold is such that a sensitivity point is set lower than that of the first carrier sense threshold. It is determined by a combination of the first and second carrier senses whether a reception error has occurred because of interference.

Referring to FIG. 2, in case 1, a busy determination time Tcca1 of the first carrier sense CCA_1 coincides (or almost coincides) with a busy determination time Tcca2 of the second carrier sense CCA_2. In this case, when a reception error is detected in reception processing, it is highly probable that the factor in the error is associated with only a pair of wireless communication apparatuses which perform the wireless communication rather than interference.

In contrast, in case 2, a busy determination time Tcca2 of the second carrier sense CCA_2 precedes a busy determination time Tcca1 of the first carrier sense CCA_1. In this case, there is "a signal at a level such that it cannot be detected based on the first carrier sense threshold and a busy state is determined based on the second carrier sense threshold". It is, therefore, estimated that there is interference at a level such that a required SINR is not satisfied even though reception processing is performed. Thus, in case 2, an error is expected to occur in reception processing at a high probability. If a reception error is actually detected, it is highly probable that the factor in the error is interference.

Note that in case 2 of FIG. 2, a result of making determination only for a given period of time is assumed, and therefore, the results of both the carrier senses indicate an idle state at the same time. If the determination operation continues after that, the result of the second carrier sense threshold may indicate an idle state after the result of the first carrier sense indicates an idle state (for example, if interference is cancelled later), or may continuously indicate a busy state (for example, if interference continuously exists).

Assume that the first carrier sense threshold is used as an actual carrier sense for determining an idle/busy state. That is, in this case, reception processing starts when a received power exceeding the first carrier sense threshold is detected, and the determination result of the first carrier sense indicates a busy state.

FIG. 3 is a schematic block diagram showing an example of the arrangement of a wireless communication apparatus 100 (corresponding to each of the wireless communication apparatuses 1 to 3 in FIG. 1) in the wireless communication system according to the embodiment.

As shown in FIG. 3, the wireless communication apparatus 100 includes a wireless unit 20, a modulation/demodulation unit 30, and a MAC processing unit 40. The modulation/demodulation unit 30 includes a modulation unit 31 and a demodulation unit 32. The MAC processing unit 40 includes a transmitting unit 41, a receiving unit 42, a communication status determination unit 43, and an interference determination unit 44. The wireless unit 20, modulation/demodulation unit 30, and MAC processing unit 40 may collectively be called a wireless transceiver unit. Furthermore, an upper layer processing unit (not shown) for processing in an upper layer is connected with the wireless transceiver unit. Note that reference number 10 in FIG. 3 denotes an antenna.

An overview of the operation of the wireless communication apparatus 100 when transmitting a signal will be described.

The transmitting unit 41 accumulates a frame output from the upper layer processing unit (not shown) in an internal transmission buffer. The transmitting unit 41 then performs processing of, for example, adding a MAC header to the frame in it, and outputs the frame to the modulation unit 31 in the accumulation order.

The modulation unit 31 performs, for the frame received from the transmitting unit 41, processing associated with a physical layer such as encoding processing, modulation processing, and addition of a physical header, and then outputs the frame to the wireless unit 20.

The wireless unit 20 performs, for the frame received from the modulation unit 31, digital-to-analog conversion processing and frequency conversion into a frequency band for wireless communication, and then transmits the frame via the antenna 10.

In the above description, assume that the transmission buffer exists within the transmitting unit 41. Instead, the transmission buffer may exist in another unit or any combination of them is also possible.

An overview of the operation of the wireless communication apparatus 100 when receiving a signal will be described.

A signal received via the antenna 10 is given to the wireless unit 20.

The wireless unit 20 performs, for the received signal, frequency conversion into a baseband, and analog-to-digital conversion processing, and then outputs the digitized signal to the demodulation unit 32.

The demodulation unit 32 performs, for the digitized signal, processing such as demodulation processing and analysis of a physical header, and then outputs the demodulated frame to the MAC processing unit 40.

The receiving unit 42 of the MAC processing unit 40 performs processing such as analysis of a MAC header for the demodulated frame. If the received frame is transmitted from the communication partner of the wireless communication apparatus 100, the receiving unit 42 outputs the received frame to the upper layer processing unit.

Assume in this system that to determine the presence/absence of interference using two kinds of carrier sense thresholds, the interference determination unit 44 sends, to the demodulation unit 32, the first carrier sense threshold, the second carrier sense threshold, and an instruction to make determination by the second carrier sense. Note that although the first carrier sense is performed at all times in this example, the interference determination unit 44 may also send, to the demodulation unit 32, an instruction to make determination by the first carrier sense.

The demodulation unit 32 performs the first and second carrier senses in response to the received instructions, and notifies the communication status determination unit 43 of results of the carrier senses.

Note that although a case in which the interference determination unit 44 notifies the demodulation unit 32 of the first carrier sense threshold and the second carrier sense threshold has been described, the embodiment is not limited to this. For example, the first carrier sense threshold and the second carrier sense threshold may have been set in advance in the demodulation unit 32. In this case, notifying the demodulation unit 32 of the first carrier sense threshold and the second carrier sense threshold is not necessary. Alternatively, only the first carrier sense threshold may have been set in advance in the demodulation unit 32. In this case, notifying the demodulation unit 32 of the first carrier sense threshold is not necessary.

Based on the results of the first carrier sense (CCA_1) using the first carrier sense threshold and the second carrier sense (CCA_2) using the second carrier sense threshold, which are given by the demodulation unit 32, the communication status determination unit 43 checks and holds each determination result (busy or idle) and, if a busy status is determined, a busy determination time (a busy determination time of CCA_2 if CCA_2 determines a busy state, and a busy determination time of CCA_1 if CCA_1 determines a busy state), and notifies the interference determination unit 44 of them.

Based on reception error information from the receiving unit 42 and carrier sense information from the communication status determination unit 43, the interference determination unit 44 determines a factor contributing to a reception error, that is, whether to perform processing for avoiding interference (note that the unit 44 may be configured to only determine whether to perform processing for avoiding interference).

If, for example, the reception error information indicates "a reception error has occurred" and the carrier sense information indicates that "the busy determination time of the second carrier sense precedes that of the first carrier sense", the unit 44 determines that the error has occurred because of interference, that is, determines to perform processing for avoiding interference (note that the unit 44 may be configured to only determine to perform processing for avoiding interference).

Alternatively, for example, if the reception error information indicates "a reception error has occurred" and the carrier sense information indicates that "the busy determination times of both the carrier senses coincide (or almost coincide) with each other", the unit 44 determines that the error has occurred not because of interference but because of the wireless communication apparatus(s) for performing the wireless communication; that is, the unit 44 determines not to perform processing for avoiding interference (note that the unit 44 may be configured to only determine not to perform processing for avoiding interference).

Note that determining not to perform processing for avoiding interference may include determining to perform processing for avoiding or cancelling a factor other than interference or the like.

If the interference determination unit 44 determines to perform processing for avoiding interference, for example, a channel switching instruction may be sent. In the example of FIG. 3, the interference determination unit 44 may send a channel switching instruction to the wireless unit 20.

FIG. 4 shows a case in which a MAC control unit 48 additionally exists within the MAC processing unit 40 shown in FIG. 3. In this case, the interference determination unit 44 may notify the MAC control unit 48 of a determination result, and the MAC control unit 48 may determine whether to perform channel switching, to perform link adaptation, to send a notification to the user, or the like. In this case, the MAC control unit 48 may send a channel switching instruction to the wireless unit 20. Note that in FIG. 4, a description of (CCA_1, CCA_2) is partially omitted as compared with FIG. 3 (this applies to FIGS. 9, 11, 13, and 14 [to be described later]).

Although a channel switching instruction is directly sent from the MAC processing unit 40 to the wireless unit 20 in FIG. 3 or 4, the MAC processing unit 40 may send a channel switching instruction to the wireless unit 20 via the modulation/demodulation unit 30 instead.

A method in which when it is determined to perform processing for avoiding interference, a channel switching instruction is sent to perform channel switching has been described above. A method of coexisting with another communication between wireless apparatuses, which causes interference on the same channel, without switching the channel may be adopted instead.

Alternatively, if it is determined to perform the processing for avoiding interference, whether to perform channel switching or processing for coexisting may be set in advance, or may be automatically selected or selected by the user according to some criteria every time.

A case in which the communication status determination unit 43 notifies the demodulation unit 32 of use threshold information for instructing the first and second carrier sense thresholds to be used for both the carrier senses (CCA_1 and CCA_2), and receives a notification about determination results (idle or busy) of CCA_1 and CCA_2, which have been determined by the demodulation unit 32 has been described above.

Instead, upon receiving a notification about a numerical value as a result of a carrier sense from the demodulation unit 32, the communication status determination unit 43 may compare the received numerical value with each of the first and second carrier sense thresholds. In this case, the interference determination unit 44 need only notify the communication status determination unit 43 of the use threshold information instead of notifying the demodulation unit 32 of the use threshold information.

In FIG. 3 or 4, the communication status determination unit 43 exists within the MAC processing unit 40. The unit 43, however, may exist within the modulation/demodulation unit 30, or may be integrated with the demodulation unit 32.

Interference determination processing by the interference determination unit 44 according to the first embodiment will now be described.

Figure 6:
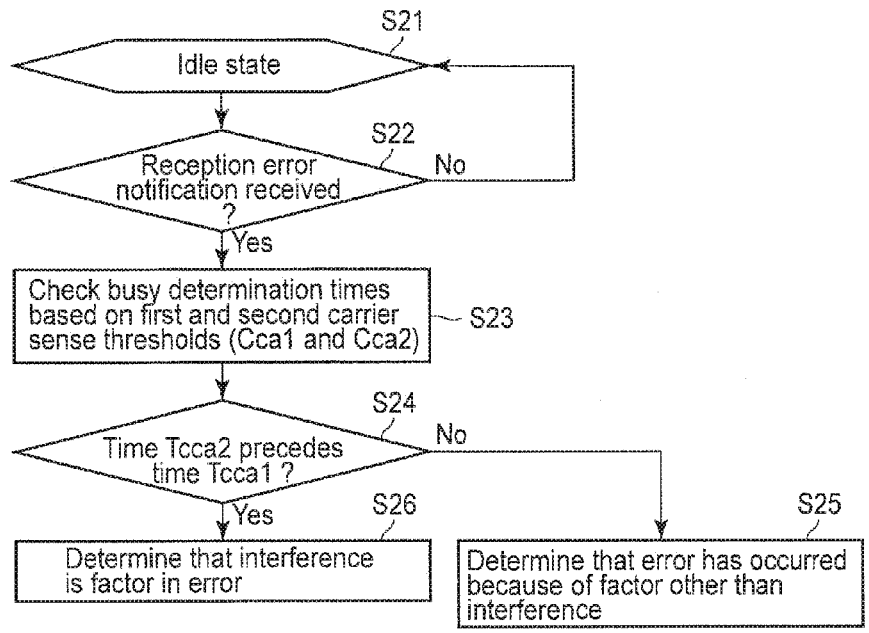
FIG. 6 is another exemplary flowchart illustrating the interference determination processing according to the first embodiment.

FIG. 5 shows an example of the interference determination processing according to the first embodiment. FIG. 6 shows another example of the interference determination processing.

FIG. 5 shows a case in which before receiving a notification about a reception processing result from the receiving unit 42, the interference determination unit 44 makes interference determination based on determination results by the respective carrier senses based on the first and second carrier sense thresholds, and busy determination time information (if both the carrier senses determine a busy state, the unit 44 determines an error factor by comparing busy determination times). In contrast, FIG. 6 shows a case in which if the interference determination unit 44 receives a notification about a reception processing result from the receiving unit 42, and the reception processing result indicates a reception error, it compares busy determination times of both the carrier senses with each other, and determines an error factor based on a comparison result.

The example of the interference determination processing shown in FIG. 5 will be described.

In step S11, an idle state is indicated as an initial state.

In step S12, the busy determination results of the respective carrier senses based on the first and second carrier sense thresholds, and busy determination times (i.e., a busy determination time of CCA_2 if CCA_2 determines a busy state, and a busy determination time of CCA_1 if CCA_1 determines a busy state) are checked.

If the determination result of the second carrier sense does not indicate a busy state (step S13), it is apparent that the determination result of the first carrier sense based on a higher threshold does not indicate a busy state. Therefore, a reception processing start condition is not satisfied (reception processing is not performed) to return to an idle state (step S15).

Although the determination result of the second carrier sense threshold indicates a busy state (step S13), if the determination result of the first carrier sense threshold does not indicate a busy state (step S14), reception processing is not performed to return to an idle state (step S15).

If the determination results of both the carrier senses indicate a busy state (steps S13 and S14), the receiving unit 42 performs reception processing. If the reception processing is done and a reception error has occurred in the reception processing, the receiving unit 42 notifies the interference determination unit 44 of the reception error.

If the determination result of both the carrier senses indicate a busy state (steps S13 and S14), and busy determination time Tcca2 of the second carrier sense threshold coincides (or almost coincides) with busy determination time Tcca1 of the first carrier sense threshold (step S16), there is no interference, and it is determined that the error has occurred because of a factor other than interference, that is, it is determined not to perform processing for avoiding interference (step S17).

Note that it may not actually be determined in step S17 that the error has occurred because of a factor other than interference. If NO is determined in step S16, it may only be determined not to perform processing for avoiding interference.

On the other hand, if busy determination time Tcca2 of the second carrier sense threshold precedes busy determination time Tcca1 of the first carrier sense threshold (step S16), and a reception error notification is received (step S18), it is determined that interference is a factor in the error, that is, it is determined to perform processing for avoiding interference (step S19).

Note that it is not necessary to actually determine in step S19 that interference is a factor in the error. If YES is determined in step S18, it may only be determined to perform processing for avoiding interference.

On the other hand, if no reception error notification is received (step S18), it is determined that interference may exist but there is no problem (step S20).

The example of the processing in FIG. 5 has the effect that even if reception processing delays, an interference determination time is made shorter. Furthermore, it is possible to stop the reception processing on the halfway according to the result of the communication status determination unit 43, and needless reception processing for an error frame is omitted, thereby expecting a decrease in power consumption.

The example of the interference determination processing shown in FIG. 6 will now be described.

In step S21, an idle state is indicated as an initial state.

If the receiving unit 42 sends no reception error notification (step S22), the process returns to an idle state (step S21).

If reception processing by the receiving unit 42 is completed and a reception error has occurred in the reception processing, the receiving unit 42 notifies the interference determination unit 44 of the reception error. Note that if a reception error notification is sent, it means that a reception processing start condition is satisfied, and thus the determination results of both the carrier senses should indicate a busy state.

If the receiving unit 42 sends a reception error notification (step S22), busy determination times of both the carrier senses based on the first and second carrier sense thresholds are checked in step S23.

If busy determination time Tcca2 of the second carrier sense threshold coincides (or almost coincides) with busy determination time Tcca1 of the first carrier sense threshold (step S24), it is determined that the error has occurred because of a factor other than interference, that is, it is determined not to perform processing for avoiding interference (step S25).

Note that it is not necessary to actually determine in step S25 that the error has occurred because of a factor other than interference. If NO is determined in step S24, it may only be determined not to perform processing for avoiding interference.

On the other hand, if busy determination time Tcca2 of the second carrier sense threshold precedes busy determination time Tcca1 of the first carrier sense threshold (step S24), it is determined that interference is a factor in the error, that is, it is determined to perform processing for avoiding interference (step S26).

Note that it is not necessary to actually determine in step S26 that interference is the factor in the error. If YES is determined in step S24, it may only be determined to perform processing for avoiding interference.

The example of the processing in FIG. 6 assumes that reception processing has completed. It is, therefore, apparent that the result of the first carrier sense which satisfies a reception processing start condition indicates a busy state and the result of the second carrier sense using a lower sensitive point also indicates a busy state, thereby enabling to omit the determination processes. Processing of comparing busy determination time Tcca1 of the first carrier sense with busy determination time Tcca2 of the second carrier sense, and the like need only be performed when a reception error occurs.

According to the wireless communication apparatus of this embodiment, as described above, when an error occurs in transmission/reception processing in near-field wireless communication, it is possible to determine whether to perform processing for avoiding interference (or whether interference is a factor in the error).

Furthermore, according to the embodiment, if the first and second carrier senses are performed using the first carrier sense threshold and the second carrier sense threshold for which a sensitivity point is lower than that for the first carrier sense threshold, respectively, and the second carrier sense indicates a busy state, it is possible to make interference determination using a corresponding busy determination time. It is also possible to determine interference based on error information from the receiving unit, and determination time difference information of the first and second carrier senses.

It is possible to determine, for example, to perform processing for avoiding interference upon occurrence of a reception error if the busy determination time of the second carrier sense precedes that of the first carrier sense. If it is possible to determine to perform processing for avoiding interference, it is also possible to avoid interference by switching a channel. On the other hand, if it is possible to determine to perform processing for avoiding or cancelling a factor other than interference or the like, it is also possible to improve the situation by attempting to transmit/receive data by decreasing the rate with link adaptation before channel switching, or by notifying the user of the factor by displaying a message like "be careful with displacement" or displaying the factor with an LED to the user.

Second Embodiment

In the first embodiment, an interference estimation method in a procedure of detecting a received power exceeding the first and second carrier sense thresholds to perform reception processing in an idle state in which the wireless communication apparatus performs no transmission/reception processing has been explained. In contrast, in the second embodiment, an interference estimation method during a response frame standby period and upon receiving a response frame when a wireless communication apparatus transmits a data frame will be described.

Figure 7:
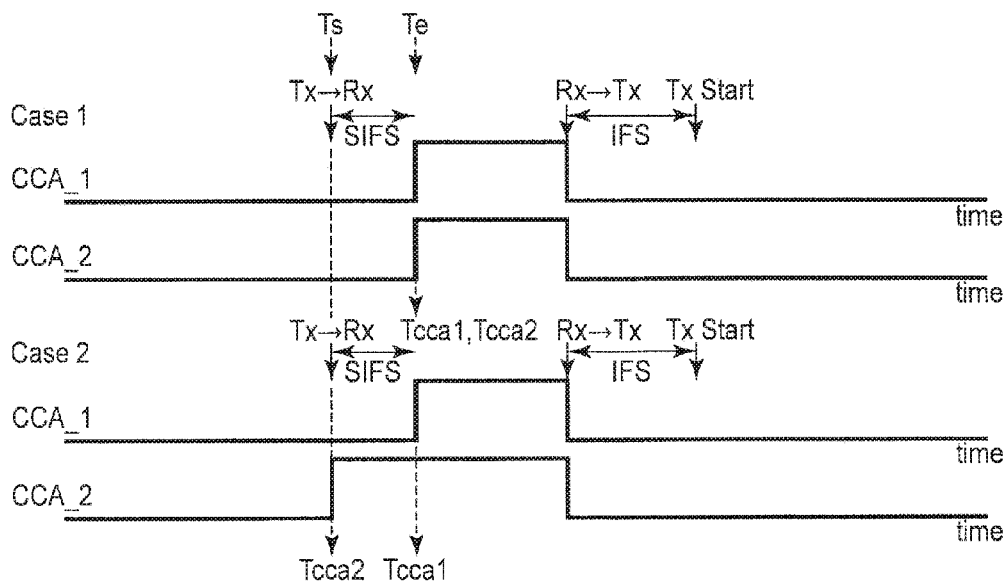
FIG. 7 is a timing chart for explaining an example of a carrier sense according to the second embodiment.

FIG. 7 shows a relationship between an idle/busy state and a determination time in a first carrier sense using a first carrier sense threshold and a second carrier sense using a second carrier sense threshold, which are used in the second embodiment.

Similarly to FIG. 2 described in the first embodiment, in case 1, the busy determination time of the first carrier sense coincides (or almost coincides) with that of the second carrier sense. In this case, even when a reception error is detected in reception processing, it is highly probable that the factor in the error is associated with only a pair of wireless communication apparatus which perform the wireless communication. On the other hand, in case 2, similarly to FIG. 2, a busy determination time based on the second carrier sense threshold precedes that based on the first carrier sense threshold. In this case, it is possible to estimate that there is interference at a level such that it cannot be detected based on the first carrier sense threshold, a busy state is determined based on the second carrier sense threshold, and a required SINR for a response signal is not satisfied. Thus, an error is expected to occur in reception processing at a high probability. If an error actually occurs, it is highly probable that the factor in the error is interference.

Note that a response signal may be, for example, an ACK response.

Unlike the first embodiment, the wireless communication apparatus transmits a data frame before the first carrier sense indicates a busy state, and then switches from transmission processing to reception processing (TX→RX in FIG. 7). The system generally operates assuming that a response frame should be transmitted after a given fixed short period of time such as an SIFS elapses. Assuming that this time is a response frame expected time (Te in FIG. 7), the determination times based on the first and second carrier thresholds desirably coincide with the response frame expected time.

Referring to FIG. 7, a response frame is transmitted after an SIFS elapses. As in case 1, therefore, as an operation upon receiving a desired signal, the first and second carrier senses indicate a busy state from the expected time Te when an SIFS elapses after transmission processing is completed (that is, a busy determination time Tcca2 coincides (or almost coincides) with a busy determination time Tcca1). Note that if reception processing is complete, ACK is returned, and then switching from reception processing to transmission processing is performed (RX→TX in FIG. 7), thereby enabling to start transmission after an IFS elapses.

On the other hand, as in case 2, transmission processing is completed, transmission/reception switching is performed (TX→RX in FIG. 7), and reception processing starts, thereby checking the carrier senses. If a result based on the second carrier sense threshold indicates a busy state immediately after switching from transmission processing to reception processing (Ts in FIG. 7), and the first carrier sense determines a busy state from the response frame expected time (that is, busy determination time Tcca2 precedes busy determination time Tcca1), an error has occurred in the response frame having undergone the reception processing at high probability.

Note that since the example shown in FIG. 7 assumes a result of making determination for a given period of time, the results of both the carrier senses indicate an idle state at the same time. If, however, determination is made at all times, the result of the second carrier sense in case 2 may continuously indicate a busy state for a period of time longer than that in the example shown in FIG. 7.

FIG. 8 shows another relationship between an idle/busy state and a determination time in both the carrier senses used in the second embodiment.

Unlike FIG. 7, FIG. 8 shows a case in which a busy determination result of the first carrier sense based on the first carrier sense does not indicate a busy state at a response frame expected time (Te in FIG. 8). In this case, since no response frame is received, it is determined that an error has occurred in a transmission frame at high probability. In this embodiment, it is determined whether the factor in the error is interference.

In case 3, the second carrier sense using the second carrier sense threshold for which a sensitivity point is lower than that for the first carrier sense threshold determines a busy state from the response frame expected time Te (determination time Tcca1 coincides with the expected time Te). On the other hand, in case 4, the second carrier sense determines a busy state immediately after switching from transmission processing to reception processing (Ts in FIG. 8) (determination time Tcca2 precedes the response frame expected time Te).

As described above, if the current state is a response frame standby state and a timer or the like can estimate a response frame reception time, that time (expected time Te) is compared with the busy determination time of the second carrier sense. If the busy determination time precedes the expected time, interference is estimated.

FIG. 9 is a schematic block diagram showing an example of the arrangement of a wireless communication apparatus 100 (corresponding to each of wireless communication apparatuses 1 to 3 in FIG. 1) in a wireless communication system according to the embodiment.

The example of the arrangement shown in FIG. 9 is basically the same as that in FIG. 3, and different points from FIG. 3 will be mainly described.

In the example of the arrangement of FIG. 9, a timer unit 45 is provided in addition to the example of the arrangement of FIG. 3.

In the embodiment, the timer unit 45 manages necessary timers. When a time-out of a timer for calculating the response frame expected time Te occurs, the timer unit 45 notifies an interference determination unit 44 of it. The interference determination unit 44 makes interference determination using the time-out timing as a response frame expected time. In the embodiment, in a response frame standby state after frame transmission, an SIFS timer for measuring an SIFS which gives a response frame expected time and an ACK Timeout (ACKTO) timer for measuring an ACKTO indicating a maximum response frame standby time have started.

Note that the timer unit 45 exists as a separate block in a MAC processing unit 40 in FIG. 9. If, however, a MAC control unit 48 additionally exists within the MAC processing unit 40 as shown in FIG. 4, the timer unit 45 may exist within the MAC control unit instead.

Other variations described in the first embodiment also apply to the second embodiment.

Interference determination processing by the interference determination unit 44 according to the second embodiment will now be described.

Figure 10:
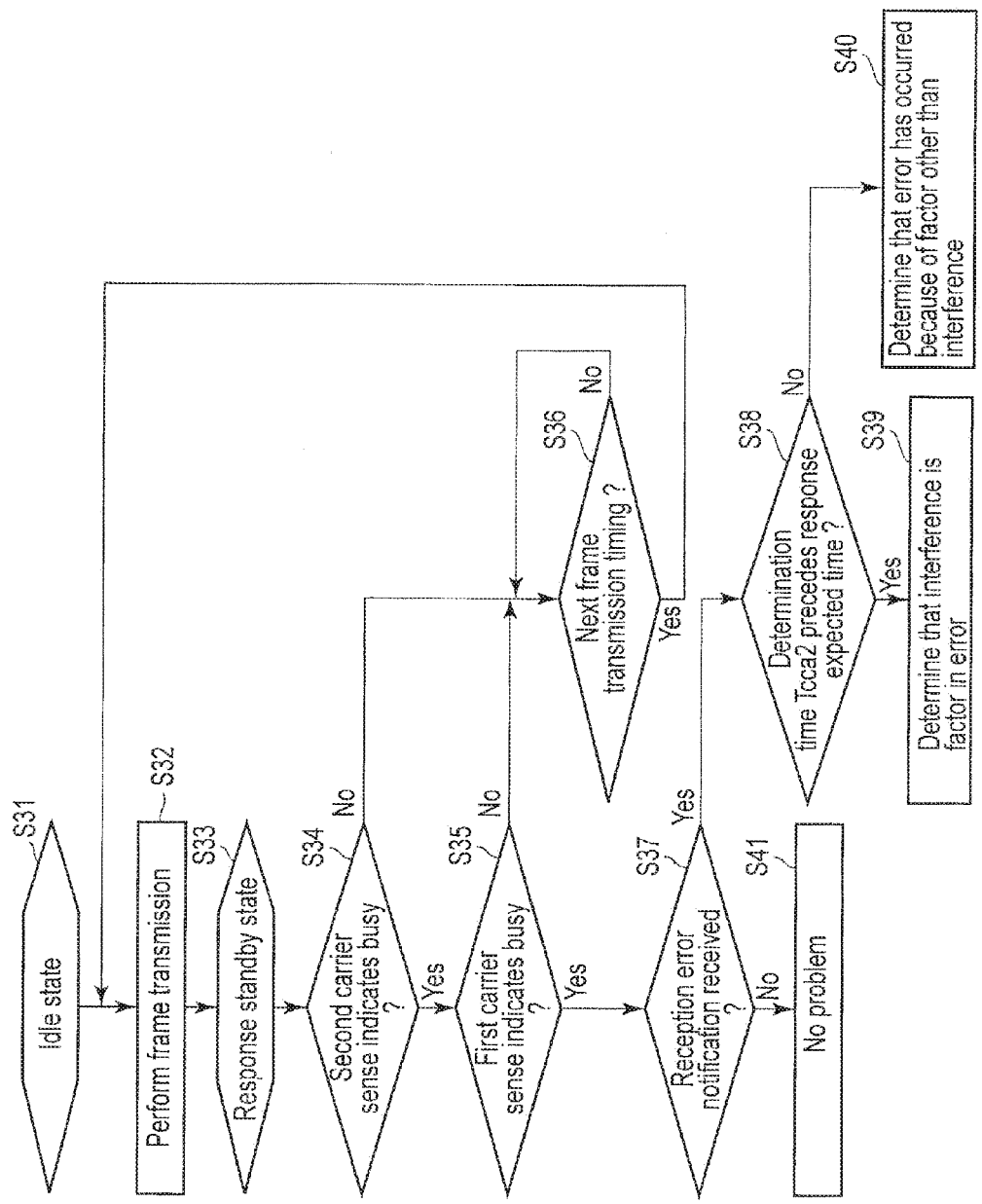
FIG. 10 is an exemplary flowchart showing interference determination processing according to the second embodiment.

FIG. 10 shows an example of the interference determination processing according to the second embodiment.

In step S31, an idle state is indicated as an initial state.

If frame transmission is performed in transmission processing (step S32), the state enters a response frame reception standby state (step S33), and it is checked whether a busy state is determined based on the second carrier sense threshold.

If a busy state is not determined based on the second carrier sense threshold (NO in step S34), or a busy state is determined based on the second carrier sense threshold and a busy state is not determined based on the first carrier sense threshold (YES in step S34 and NO in step S35) during a response frame standby period (ACKTO), next frame transmission is performed (step S32) after a predetermined period of time elapses (step S36). This processing is repeated as needed.

On the other hand, assume that a busy state is determined based on the second carrier sense threshold and a busy state is also determined based on the first carrier sense threshold (YES in step S34 and YES in step S35). In this case, if a reception error notification is received (step S37), determination time Tcca2 is compared with the response frame expected time Te. If determination time Tcca2 precedes the response frame expected time Te, it is determined that an error is expected to occur in transmission/reception processing because of interference, that is, it is determined to perform processing for avoiding interference (step S39).

Note that it is not necessary to actually determine in step S39 that interference is a factor in the error. If YES is determined in step S38, it may only be determined to perform processing for avoiding interference.

On the other hand, if determination time Tcca2 coincides (or almost coincides) with the response expected time Te, it is determined that the error has occurred because of a factor other than interference, that is, it is determined not to perform processing for avoiding interference (step S40).

Note that it is not necessary to actually determine in step S40 that the error has occurred because of a factor other than interference. If NO is determined in step S38, it may only be determined not to perform processing for avoiding interference.

Note that determining not to perform processing for avoiding interference may include determining to perform processing for avoiding or cancelling a factor other than interference or the like.

On the other hand, if no reception error notification is received (NO in step S37), it is determined that interference may exist but there is no problem (step S41).

According to the embodiment, during a response signal reception standby state to frame transmission, it is possible to make interference determination by comparing a time when it is expected to receive a response signal from the timer with the busy determination time of the second carrier sense irrespective of a result of the first carrier sense.

As described above, according to the wireless communication apparatus of the embodiment, when an error occurs in transmission/reception processing in near-field wireless communication, it is possible to determine whether to perform processing for avoiding interference (or whether interference is a factor in the error).

Third Embodiment

In the first and second embodiments, a method of making interference determination upon receiving or transmitting a frame has been described. On the other hand, in the third embodiment, an interference determination unit 44 for making interference determination which has been explained in the first and second embodiments is activated only when necessary instead of making interference determination at all times. As described in the first and second embodiments, for example, when an error occurs in frame reception, or when, even though frame transmission has been performed, a response frame is not received at a response frame expected time, a reception error has occurred in a received response frame, or a received response frame does not have a desired sequence number, it is desirable to determine whether interference is a factor and/or whether to perform processing for avoiding interference.

In the third embodiment, processing in which a carrier sense using only a first carrier sense threshold usually makes busy determination, and first and second carrier senses using the first carrier sense threshold and a second carrier sense threshold make busy determination only when a transmission/reception error has occurred as described above will be described.

Figure 11:
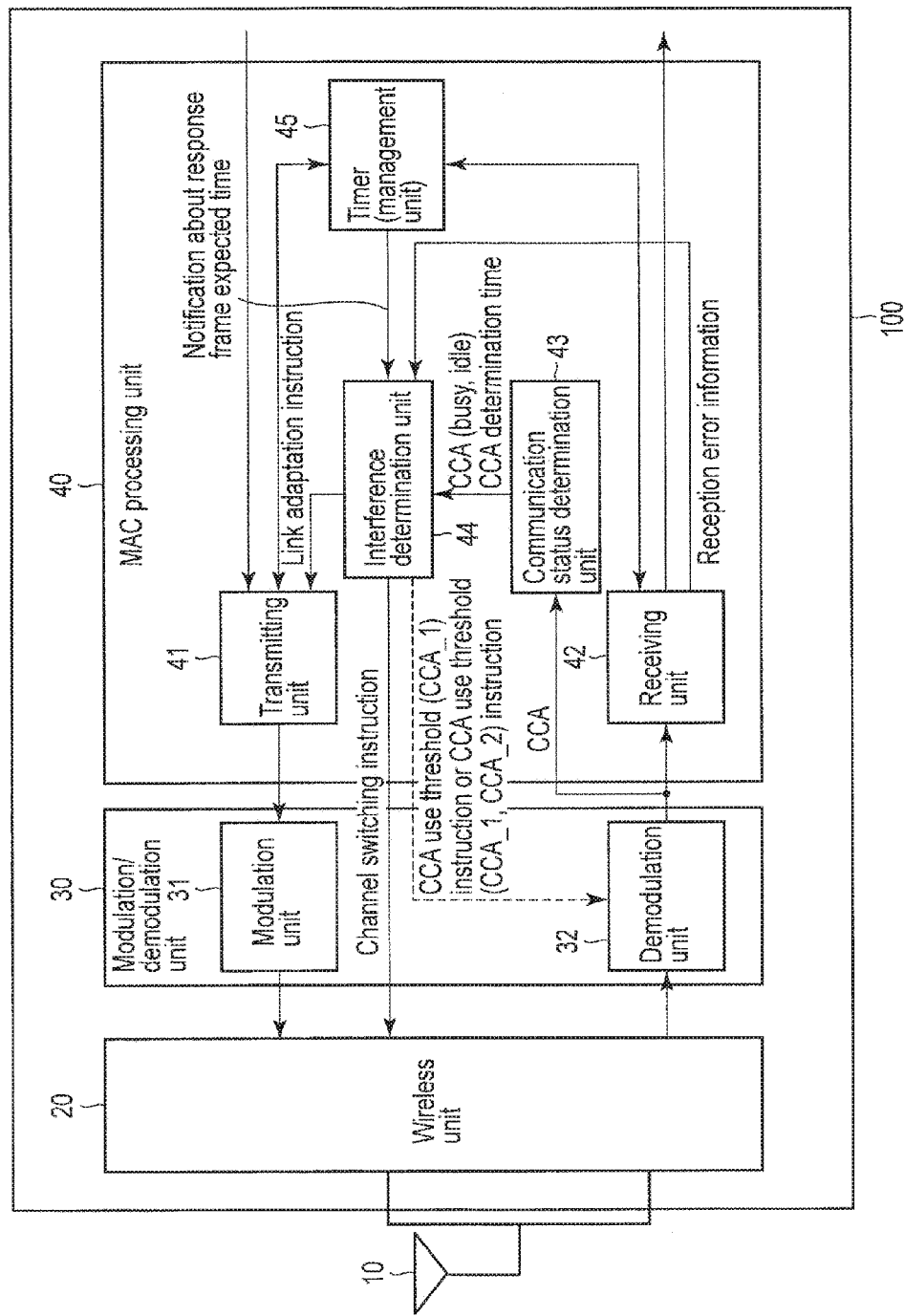
FIG. 11 is an exemplary block diagram showing a wireless communication apparatus according to the third embodiment.

FIG. 11 is a schematic block diagram showing an example of the arrangement of a wireless communication apparatus 100 (corresponding to each of wireless communication apparatuses 1 to 3 in FIG. 1) in a wireless communication system according to the embodiment.

The example of the arrangement shown in FIG. 11 is basically the same as that in FIG. 3 or 9, and different points from FIG. 3 or 9 will be mainly described. Note that in the example of the arrangement of FIG. 11, a timer unit 45 is provided in addition to the example of the arrangement of FIG. 3.

Furthermore, the timer unit 45 exists as a separate block in a MAC processing unit 40 in FIG. 9. If, however, a MAC control unit 48 additionally exists within the MAC processing unit 40 as shown in FIG. 4, the timer unit 45 may exist within the MAC control unit instead.

Other variations described in the first and second embodiments also apply to the third embodiment.

The interference determination unit 44 generally notifies a demodulation unit 32 of the first carrier sense threshold as a CCA use threshold. When reception error information from a receiving unit 42 or a timeout notification of response frame expected time from the timer unit 45 is input, the interference determination unit 44 notifies the demodulation unit 32 of the first and second carrier sense thresholds as CCA use thresholds. Processing thereafter is the same as that in the first and second embodiments, and a description thereof will be omitted.

As describe above, in this embodiment, the interference determination unit 44 need only be activated using the reception error information or a response frame standby period time-out information as a trigger, and need not be active at all times. It is, therefore, expected to suppress power to be consumed by the wireless communication apparatus to make interference determination. The interference determination processing of FIG. 6 described in the first embodiment branches in the first processing procedure using a reception processing error notification. As in the embodiment, therefore, the interference determination unit 44 may be activated using a reception processing error notification as a trigger, and may start comparison processing between the first and second carrier sense thresholds only when an error has occurred in reception processing.

Instead of activating the interference determination unit 44 upon occurrence of a transmission/reception error, as another example of this embodiment, a carrier sense may be performed using only the first carrier sense threshold during connection processing which is performed between two wireless communication apparatuses before start of transmission/reception processing, the interference determination unit 44 of the embodiment may be activated while transmitting/receiving a data frame after the connection processing, and both the carrier senses may be performed using the first and second carrier sense thresholds, respectively. That is, during the connection processing, for example, alignment between two wireless communication apparatuses has a large influence or, if a plurality of frequencies are used, interference has little influence since a search is performed while changing the frequency, thereby allowing a method of omitting such interference determination.

As still another example, if it is determined that there is interference from another system or it is determined to perform processing for avoiding interference by performing the above interference determination processing upon occurrence of a transmission/reception error, the determination processing using the first and second carrier sense thresholds as described in the first and second embodiments is performed at all times until a connection with a partner wireless communication apparatus at this time is disconnected. If interference is a factor but channel switching is not performed in subsequent processing, the determination processing using the first and second carrier sense thresholds may be applied. On the other hand, if channel switching is performed, transmission/reception processing may start using only the first carrier sense after the channel switching.

According to the wireless communication apparatus of the embodiment, when an error occurs in transmission/reception processing in near-field wireless communication, it is possible to determine whether to perform processing for avoiding interference (or whether interference is the factor in the error).

Furthermore, according to the embodiment, it is also possible to activate the interference determination unit a minimum number of times, and to use the second carrier sense only when necessary. This enables to immediately specify a factor in an error upon occurrence of the error while reducing the processing load of interference determination.

Fourth Embodiment

In the first to third embodiments, a mechanism of determining, using the first and second carrier sense thresholds, whether a transmission/reception error has occurred because of interference (and/or whether to perform processing for avoiding interference) has been explained. On the other hand, in the first to third embodiments, as a solution when interference is specified as a factor in the error (or it is determined to perform processing for avoiding interference), changing a frequency channel is considered first. The number of frequency channels, however, is limited. If data are exchanged between other wireless communication apparatuses in another system or the self system using a plurality of frequency channels, it may be impossible to select a frequency channel not in use. Furthermore, transmission/reception characteristics for each frequency channel may vary depending on a wireless communication apparatus. In this case, it may be desirable to select a frequency channel with as good transmission/reception characteristics as possible. In this embodiment, processing when it is desirable to perform transmission/reception processing without changing the frequency even though interference is considered as a factor in the error will be described.

When interference exists, an error occurs in transmission/reception processing at high probability even though the first carrier sense indicates an idle state based on a first carrier sense threshold. If, therefore, uselessly continuing to attempt transmission is inappropriate in terms of the power consumption of a wireless communication apparatus. In this embodiment, therefore, if it is determined that interference exists, the same value as a second carrier sense threshold may be set as a carrier sense threshold for an actual carrier sense (the first carrier sense) instead of the first carrier sense threshold, and transmission/reception processing may be performed using only the second carrier sense threshold. Alternatively, the same value as the second carrier sense threshold may be set instead of the first carrier sense threshold only in transmission processing.

As described above, assume in a considered near-field system that the sensitivity point of the first carrier sense has been set high so that only wireless communication apparatuses close to each other perform connection processing. In this case, it is desirable to use the first carrier sense threshold as a carrier sense threshold in connection processing. Even if, however, the second carrier sense threshold is used in data frame transmission/reception processing in a connection state after the connection processing, the above problem does not arise. Only when, therefore, it is determined that interference exists after the connection processing, the same value as the second carrier sense threshold may be used as the general first carrier sense threshold.

Assume that as a result of the determination processing in the first to third embodiments, it is highly probable that interference exists and is a factor in an error, and a frequency channel is not changed. In this case, by performing at least transmission determination processing using the second carrier sense threshold, it is possible to avoid transmission processing from being unnecessarily performed when it is highly probable that an error will occur because of interference even though transmission processing is performed.

As described above, according to the wireless communication apparatus of the embodiment, when an error occurs in transmission/reception processing in near-field wireless communication, it is possible to determine whether to perform processing for avoiding interference (or whether interference is a factor in the error).

Fifth Embodiment

In the first to fourth embodiments, a method of using the first and second carrier sense thresholds has been explained.

In the fifth embodiment, a method of determining a second carrier sense threshold will be described.

FIG. 12 shows an example of characteristics of a signal-to-interference-plus-noise ratio (SINR) and received signal strength indicator (RSSI) when the distance between wireless communication apparatuses in a self system is decided. The abscissa represents a distance d between a transmitting/receiving wireless communication apparatus and a wireless communication apparatus in another system. The characteristics of the SINR and RSSI as shown in FIG. 12 can be calculated if settings such as the antenna gain of a self wireless communication apparatus, and the transmission powers of the self system and the other system are identified.

Note that a region in which the RSSI is greater than or equal to the first carrier sense threshold is a region in which a busy state is determined. A region in which the RSSI is smaller than the first carrier sense threshold is a region in which an idle state is determined. A region in which the SINR is greater than or equal to a required SINR (a required signal-to-interference-plus-noise ratio) is a region in which the required SINR is satisfied. A region in which the SINR is smaller than the required SINR is a region in which the required SINR is not satisfied.

It is apparent from FIG. 12 that by applying the first carrier sense threshold (y in FIG. 12) and the required SINR (x in FIG. 12) which have been decided in the system to the graph showing the SINR and RSSI which have been calculated under the above setting conditions, "a range in which the RSSI indicates an idle state but the required SINR is not satisfied" (denoted by reference number 1000 in FIG. 12) exists, and it is possible to reduce or remove the range by decreasing the carrier sense threshold. As shown in FIG. 12, for example, the second carrier sense threshold is obtained by decreasing the sensitivity point of the first carrier sense threshold so that the above range disappears. Since, as described above, the graph shown in FIG. 12 is determined by only the setting conditions of the system, the wireless communication apparatus can perform calculation in advance, and it is not necessary to perform recalculation for each connection processing and recalculation in a connection state.

By setting the second carrier sense threshold in advance based on the characteristics of the SINR and RSSI so as to omit a range in which the RSSI indicates an idle state but the required SINR is not satisfied, and then using the second carrier sense threshold similarly to the first to fourth embodiments, it is possible to determine a factor in an error, to determine whether to perform processing for avoiding interference, or the like.

According to the embodiment, by deciding the second carrier sense threshold so that the carrier sense always indicates a busy state when a signal-to-interference-plus-noise ratio is less than or equal to a required signal-to-interference-plus-noise ratio, it is possible to specify a factor in an error which occurs in transmission/reception processing because of interference, and to determine whether to perform processing for avoiding interference, using at least the second carrier sense threshold, although the carrier sense indicates an idle state.

Variations to the above-described embodiments will be described below. It is possible to implement any one of the following embodiments or any combination of the following embodiments by combining with some of the above-described embodiments.

Sixth Embodiment

In the sixth embodiment, a configuration obtained by adding a buffer to the configuration (see a wireless communication apparatus 100 of FIG. 3, 4, 9 or 11) of a wireless communication apparatus according to any one of the above-described embodiments will be described. The buffer is connected with a transmitting unit 41 and a receiving unit 42. The buffer may reside within an upper layer processing unit (not shown) or may reside between the transmitting unit 41/receiving unit 42 and the upper layer processing unit, or a combination thereof is also possible. By configuring to include the buffer in the wireless communication apparatus, it becomes possible to hold transmission/reception data in the buffer, and to readily perform retransmission processing and/or external output processing.

Seventh Embodiment

In the seventh embodiment, a configuration obtained by adding a bus, a processor unit, and an external interface to the configuration of a wireless communication apparatus according to the sixth embodiment will be described. The bus is connected with a buffer described in the sixth embodiment, and the processor unit and the external interface unit are respectively connected with the bus (that is, the processor unit and the external interface unit are respectively connected with the buffer via the bus). Firmware may operate in the processor unit. The processor unit, bus, and external interface may reside in an upper layer processing unit (not shown) or may reside separately from the upper layer processing unit, or a combination thereof is also possible. By configuring to include firmware in the wireless communication apparatus, it becomes possible to readily change the function of the wireless communication apparatus by rewriting the firmware.

Eighth Embodiment

In the eighth embodiment, a configuration obtained by adding a moving image compression/decompression unit to the configuration of a wireless communication apparatus according to the seventh embodiment will be described. The moving image compression/decompression unit is connected with a bus described in the seventh embodiment. By configuring to include the image compression/decompression unit in the wireless communication apparatus, it becomes possible to readily transmit a compressed moving image, and decompress a received compressed moving image.

Ninth Embodiment

In the ninth embodiment, a configuration obtained by adding a clock generation unit to the configuration of a wireless communication apparatus according to any one of the above-described embodiments will be described. The clock generation unit is connected with the wireless transceiver unit of the wireless communication apparatus. Note that the wireless transceiver unit corresponds to, for example, a portion which includes a wireless unit 20, a modulation/demodulation unit 30, and a MAC processing unit 40 as a whole in FIG. 3, 4, 9, or 11. A clock generated by the clock generation unit is externally output via an output terminal. In this way, by externally outputting a clock generated within the wireless communication apparatus, and operating the host side based on the externally output clock, it becomes possible to operate the host side and the wireless communication apparatus side in synchronism with each other.

10th Embodiment

Figure 13:
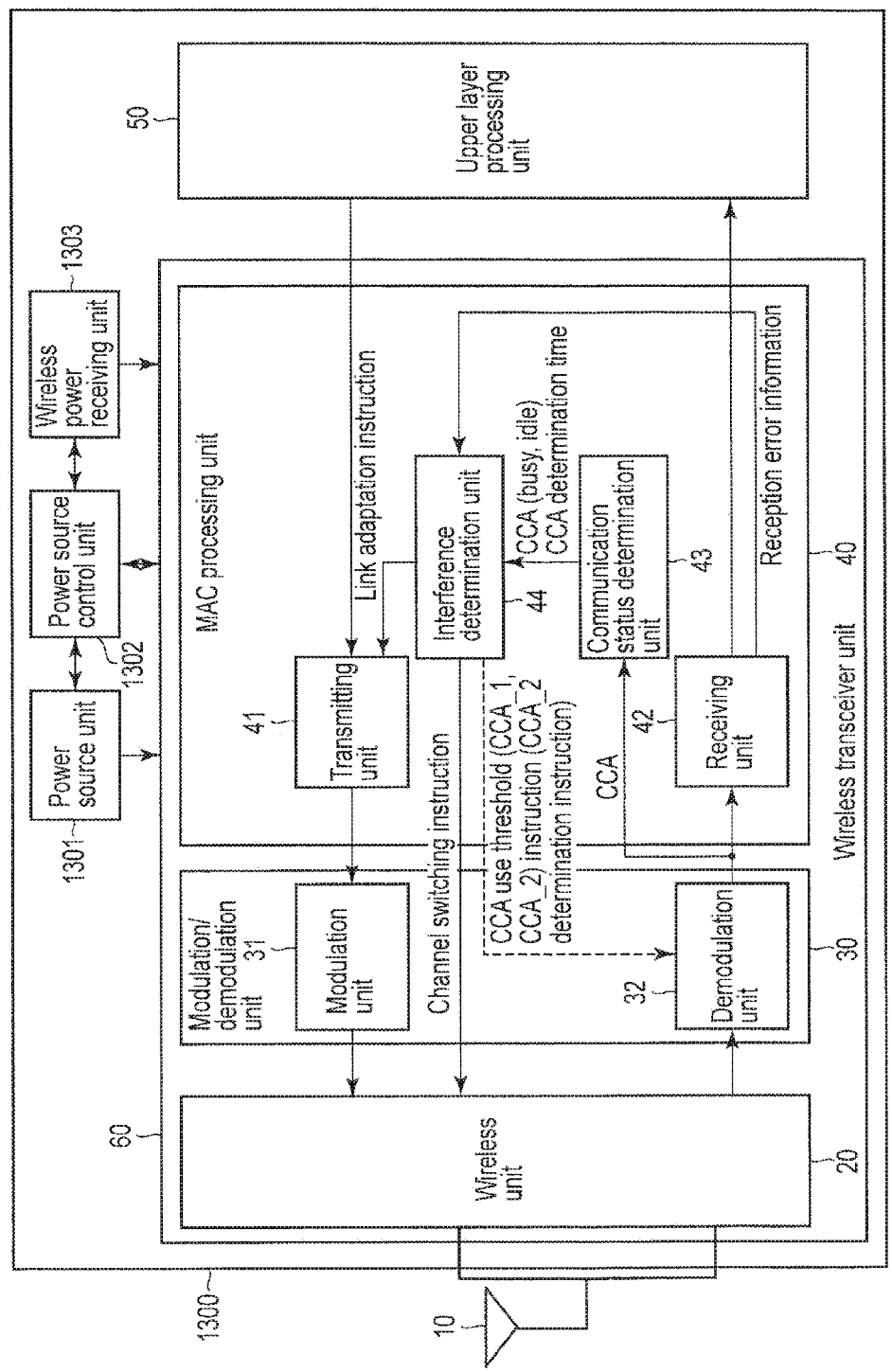
FIG. 13 is an exemplary block diagram showing a wireless communication apparatus according to the 10th embodiment.

In the 10th embodiment, a configuration obtained by adding a power source unit, a power source control unit, and a wireless power receiving unit to the configuration of a wireless communication apparatus according to any one of the above-described embodiments will be described. The power source unit, power source control unit, and wireless power receiving unit are connected with the wireless transceiver unit of the wireless communication apparatus. As an example, FIG. 13 shows a configuration example obtained by adding the power source unit, power source control unit, and wireless power receiving unit to a wireless communication apparatus 100 of FIG. 3. In a wireless communication apparatus 1300 shown in FIG. 13, a power source unit 1301, a power source control unit 1302, and a wireless power receiving unit 1303 are respectively connected with a wireless transceiver unit 60. By configuring to include the power supply in the wireless communication apparatus, it becomes possible to perform a power consumption reducing operation while controlling the power supply.

11th Embodiment

In the 11th embodiment, a configuration obtained by adding a near-field communications (NFC) transceiver unit to the configuration of a wireless communication apparatus of the 10th embodiment will be described. The NFC transceiver unit is connected with the power source control unit and MAC processing unit of the wireless communication apparatus. For a wireless communication apparatus 1100 of FIG. 13, for example, the NFC transceiver unit is connected with a wireless communication apparatus 1302 and a MAC processing unit 40 within a wireless transceiver unit 60 in FIG. 13. The NFC transceiver unit may reside within an upper layer processing unit 50, or may reside separately from the upper layer processing unit 50. By configuring to include the NFC transceiver unit in the wireless communication apparatus, it becomes possible to readily perform authentication processing, and to reduce the power consumption in a standby state by controlling the power supply using the NFC transceiver unit as a trigger.

12th Embodiment

In the 12th embodiment, a configuration obtained by adding a SIM card to the configuration of a wireless communication apparatus according to the 10th or 11th embodiment will be described. The SIM card is connected with a MAC processing unit 40. The SIM card may reside within an upper layer processing unit 50, or may reside separately from the upper layer processing unit 50. By configuring to include the SIM card in the wireless communication apparatus, it becomes possible to readily perform authentication processing.

13th Embodiment

In the 13th embodiment, a configuration obtained by adding an LED unit to the configuration of a wireless communication apparatus according to any one of the above-described embodiments will be described. The LED unit is connected with the wireless transceiver unit of the wireless communication apparatus. By configuring to include the LED in the wireless communication apparatus, it becomes possible to readily notify the user of the operation state of the wireless communication apparatus.

14th Embodiment

In the 14th embodiment, a configuration obtained by adding a vibrator unit to the configuration of a wireless communication apparatus according to any one of the above-described embodiments will be described. The vibrator unit is connected with the wireless transceiver unit of the wireless communication apparatus. By configuring to include the vibrator in the wireless communication apparatus, it becomes possible to readily notify the user of the operation state of the wireless communication apparatus.

15th Embodiment

In the 15th embodiment, a configuration obtained by adding an antenna 10 to the configuration of a wireless communication apparatus according to any one of the above-described embodiments will be described. By configuring to include the antenna 10 in a wireless communication apparatus 1, it is possible to form a wireless communication apparatus as one apparatus including an antenna, thereby decreasing the implementation area. As shown in, for example, FIG. 3, 4, 9, 11 or 13, transmission processing and reception processing share the antenna 10. By sharing one antenna by transmission processing and reception processing, it is possible to downsize the wireless communication apparatus.

16th Embodiment

In the 16th embodiment, a configuration obtained by adding a wireless LAN unit and a wireless switching unit to the configuration of a wireless communication apparatus according to any one of the above-described embodiments will be described. As an example, FIG. 14 shows a configuration example obtained by adding the wireless LAN unit and wireless switching unit to a wireless communication apparatus 100 of FIG. 9. In a wireless communication apparatus 1400 shown in FIG. 14, a wireless LAN unit 141 is connected with an upper layer processing unit 50 and a wireless switching unit 142, and the wireless switching unit 142 is connected with a wireless transceiver unit 60, the upper layer processing unit 50, and the wireless LAN unit 141. By configuring to include the wireless LAN function in the wireless communication apparatus, it becomes possible to switch between communications through a wireless LAN and a wireless transceiver unit 60 depending on a situation. Although it is possible to use a plurality of channels in a millimeter waveband as described above, it may be possible to switch to communication through a wireless LAN when, in a target wireless communication system, there is large interference with another wireless communication system on all the channels and therefore desired transmission/reception is impossible. The wireless LAN may be a wireless communication system (for example, an IEEE 802.11a, b, or g wireless system) which uses a frequency band different from that used by the target wireless communication system, or a wireless system (for example, an IEEE 802.11ad wireless communication system) which uses the same frequency band as that used by the target wireless communication system. Furthermore, the wireless LAN unit may have its own transmission/reception antenna. A wireless LAN which uses the same frequency band as that used by the target wireless communication system may share an antenna with the target wireless communication system.

17th Embodiment

In the 17th embodiment, a configuration obtained by adding a switch (SW) to the configuration of a wireless communication apparatus according to the 16th embodiment will be described. The switch is connected with a wireless transceiver unit, a wireless LAN unit, and a wireless switching unit. In a wireless communication apparatus 1400 of FIG. 14, the switch is connected with a wireless transceiver unit 60, wireless LAN unit 141, and wireless switching unit 142 of FIG. 14. By configuring to include the switch in the wireless communication apparatus, it becomes possible to switch between communications through a wireless LAN or the wireless transceiver unit 60 depending on a situation while sharing an antenna.

According to a wireless communication apparatus of at least one of the above-described embodiments, when an error occurs in transmission/reception processing in near-field wireless communication, it is possible to determine whether to perform processing for avoiding interference.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A near-field wireless communication apparatus comprising:
a first processor configured to:
detect a first busy state where a received power level becomes equal to or more than a first threshold, and
detect a second busy state where the received power level becomes equal to or more than a second threshold, the second threshold being smaller than the first threshold; and
a second processor configured to:
perform processing interference error in response to detecting the second busy state and not detecting the first busy state, and
perform processing near-field error in response to detecting the first busy state.

2. The apparatus according to claim 1, the second processor is further configured to perform processing for transmission in response to detecting the second busy state and not detecting the first busy state.

3. The apparatus according to claim 1, the second processor is further configured to:
determine whether or not a received power level of a second frame preceded by a first frame becomes equal to or more than the second threshold; and
perform reception processing for the second frame based on a result of the determination, when the second processor determines that interference occurs in the first frame.

4. The apparatus according to claim 1, the second processor is further configured to:

determine whether or not a received power level of a second frame preceded by a first frame becomes equal to or more than the second threshold; and
perform reception processing for the second frame based on a result of the determination, when the second processor determines that an error occurs in the first frame.

5. The apparatus according to claim 1, the second processor is further configured to count an elapsed time after frame transmission processing is completed.

6. The apparatus according to claim 5, the second processor is further configured to:
determine whether the received power level becomes equal to or more than the second threshold before the elapsed time becomes a fixed period of time; and
perform reception processing when the fixed period of time elapses after the frame transmission processing is completed, in response to determining that the received power level becomes equal to or more than the second threshold before the elapsed time becomes the fixed period of time.

7. The apparatus according to claim 1, the first processor and the second processor are the same processor.

8. The apparatus according to claim 1, further comprising a third processor configured to perform frequency conversion of a received frame.

9. The apparatus according to claim 1, further comprising at least one antenna.

10. The apparatus according to claim 1, further comprising a light-emitting diode (LED) configured to notify a user of a notification.

11. A wireless communication apparatus comprising:
a buffer configured to store a frame; and
processing circuitry,
the processing circuitry being configured to:
detect a first busy state where a received power level becomes equal to or more than a first threshold,
detect a second busy state where the received power level becomes equal to or more than a second threshold, the second threshold being smaller than the first threshold,
perform processing interference error in response to detecting the second busy state and not detecting the first busy state, and
perform processing near-field error in response to detecting the first busy state.

12. The apparatus according to claim 11, the processing circuitry is further configured to perform processing for transmission in response to detecting the second busy state and not detecting the first busy state.

13. The apparatus according to claim 11, the processing circuitry is further configured to:
determine whether or not a received power level of a second frame preceded by a first frame becomes equal to or more than the second threshold; and
perform reception processing for the second frame based on a result of the determination, when the processing circuitry determines that interference occurs in the first frame.

14. The apparatus according to claim 11, the processing circuitry is further configured to:
determine whether or not a received power level of a second frame preceded by a first frame becomes equal to or more than the second threshold; and
perform reception processing for the second frame based on a result of the determination, when the processing circuitry determines that an error occurs in the first frame.

15. An interference detection method for a wireless communication apparatus including a first processor and a second processor, the method comprising:
- detecting, by the first processor, a first busy state where a received power level becomes equal to or more than a first threshold;
- detecting, by the first processor, a second busy state where the received power level becomes equal to or more than a second threshold, the second threshold being smaller than the first threshold;
- performing processing interference error in response to detecting the second busy state and not detecting the first busy state, and
- performing, by the second processor, processing near-field error in response to detecting the first busy state.

16. The method according to claim 15, further comprising:
- performing, by the second processor, processing for transmission in response to detecting the second busy state and not detecting the first busy state.

17. The method according to claim 15, further comprising:
- determining, by the second processor, whether or not a received power level of a second frame preceded by a first frame becomes equal to or more than the second threshold; and
- performing, by the second processor, reception processing for the second frame based on a result of the determination, when it is determined that interference occurs in the first frame.

18. The method according to claim 15, further comprising:
- determining, by the second processor, whether or not a received power level of a second frame preceded by a first frame becomes equal to or more than the second threshold; and
- performing, by the second processor, reception processing for the second frame based on a result of the determination, when it is determined that an error occurs in the first frame.

19. The method according to claim 15, further comprising:
- counting, by the second processor, an elapsed time after frame transmission processing is completed.

20. The method according to claim 19, further comprising:
- determining, by the second processor, whether the received power level becomes equal to or more than the second threshold before the elapsed time becomes a fixed period of time; and
- performing, by the second processor, reception processing when the fixed period of time elapses after the frame transmission processing is completed, in response to determining that the received power level becomes equal to or more than the second threshold before the elapsed time becomes the fixed period of time.

* * * * *